United States Patent [19]

La Chiusa

[11] 4,135,609
[45] * Jan. 23, 1979

[54] BRAKE AND ACCELERATOR CONTROL FOR OPERATING A MOTOR DRIVEN VEHICLE

[75] Inventor: Arturo A. La Chiusa, Los Angeles, Calif.

[73] Assignee: Auto-Safe Research and Development Corporation, Rochester, N.Y.

[*] Notice: The portion of the term of this patent subsequent to Mar. 16, 1993, has been disclaimed.

[21] Appl. No.: 638,823

[22] Filed: Dec. 8, 1975

Related U.S. Application Data

[63] Continuation-in-part of Ser. No. 303,517, Nov. 9, 1972, Pat. No. 3,944,012, and a continuation-in-part of Ser. No. 826,554, May 21, 1969, abandoned.

[51] Int. Cl.² .................................. B60K 41/20
[52] U.S. Cl. ............................................ 192/3 S
[58] Field of Search ............ 180/77 R; 192/3 S, 3 R, 192/.049, .094, .082; 74/513, 560

[56] References Cited

U.S. PATENT DOCUMENTS

| | | | |
|---|---|---|---|
| 2,024,055 | 12/1935 | Moore | 192/3 S |
| 2,083,940 | 6/1937 | Burton et al. | 192/3 S |
| 2,203,777 | 6/1940 | Detmers | 192/3 R |
| 2,542,410 | 2/1951 | Hedges | 192/3 S |
| 2,902,123 | 9/1959 | Brugidou | 192/3 S |
| 2,931,246 | 5/1960 | Lerman | 74/560 X |
| 2,936,867 | 5/1960 | Perry | 192/3 S |
| 3,386,541 | 6/1968 | Luijt | 192/3 R |
| 3,944,012 | 3/1976 | La Chiusa | 180/77 R |

FOREIGN PATENT DOCUMENTS

| | | | |
|---|---|---|---|
| 261536 | 11/1926 | United Kingdom | 180/77 R |
| 646216 | 11/1950 | United Kingdom | 192/3 S |
| 736549 | 9/1955 | United Kingdom | 180/77 R |
| 1051785 | 12/1966 | United Kingdom | 180/77 R |
| 1063067 | 3/1967 | United Kingdom | 180/77 R |

*Primary Examiner*—Kenneth H. Betts
*Attorney, Agent, or Firm*—Joseph Shulsinger

[57] ABSTRACT

A foot operated control for operating an accelerator and braking means of a motor driven vehicle through actuation of a single suspended pedal. A brake lever associated with the vehicle braking means is mounted at one end to a shaft pivotally supported in a mounting bracket and carrying a pivot pin adjacent the other end, the brake lever providing vehicle braking action when pivoted in a first direction; an accelerator lever associated with the vehicle carburetor and mounted on the brake lever pivot pin so as to be pivotal in an opposite direction to cause acceleration of the vehicle; and a provision for preventing the two levers from concurrently actuating the associated braking means and carburetor to avoid simultaneous functioning of the system to accelerate the motor while applying the brakes to decelerate or stop the automobile. There is also disclosed a foot pad assembly for the foot operated control which precludes vehicle acceleration when the foot control is unattended.

2 Claims, 16 Drawing Figures

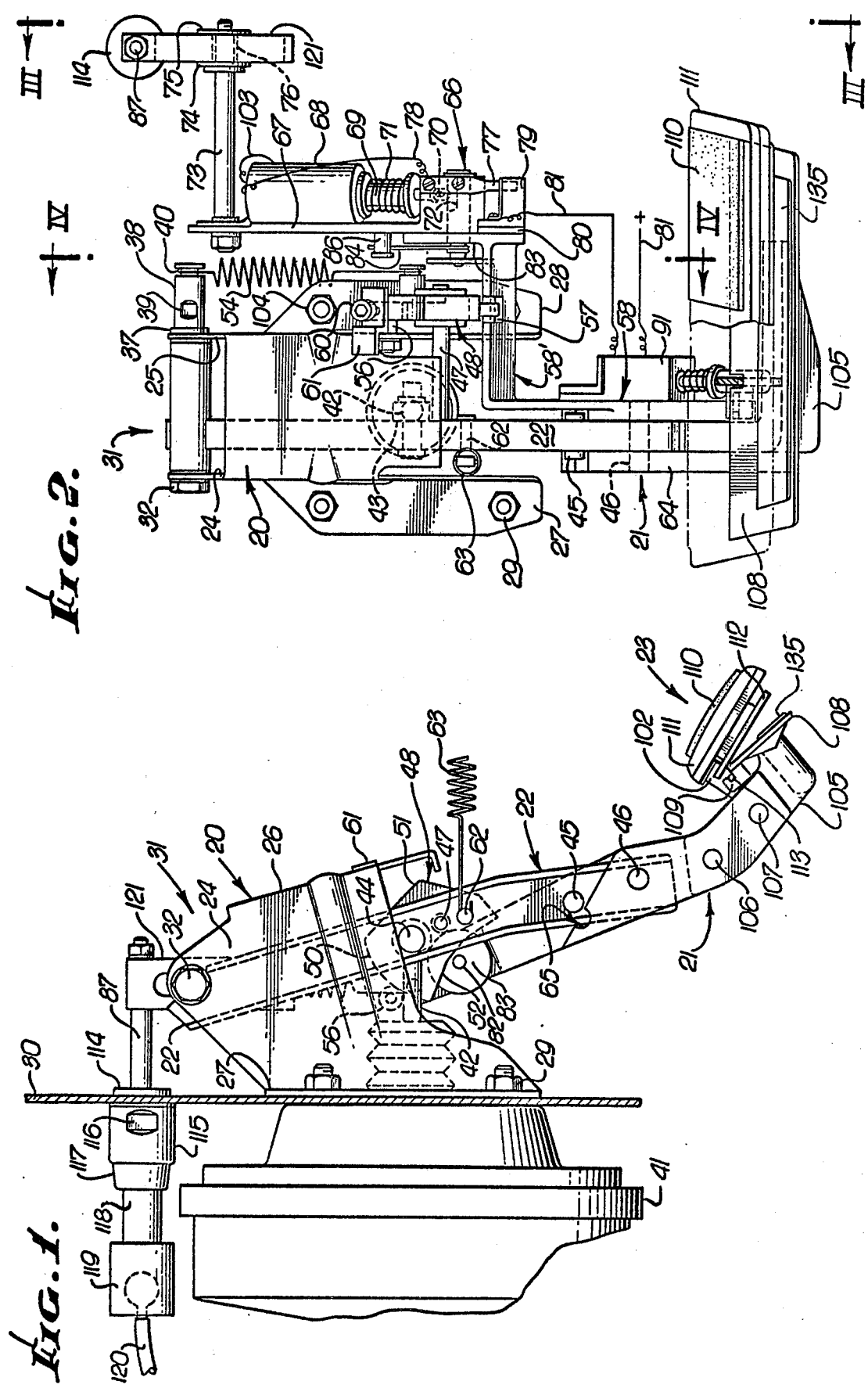

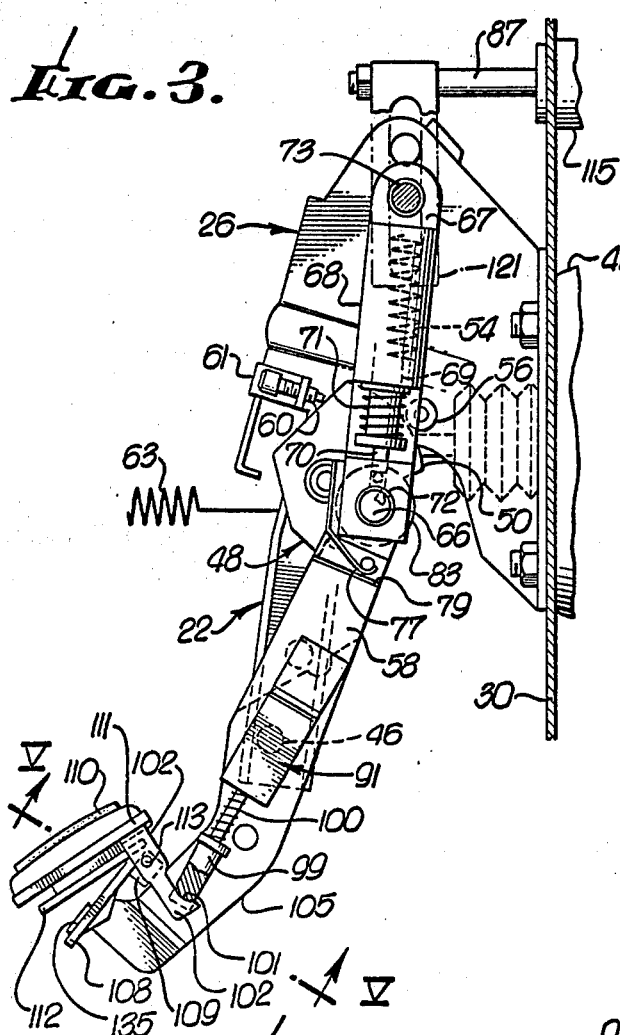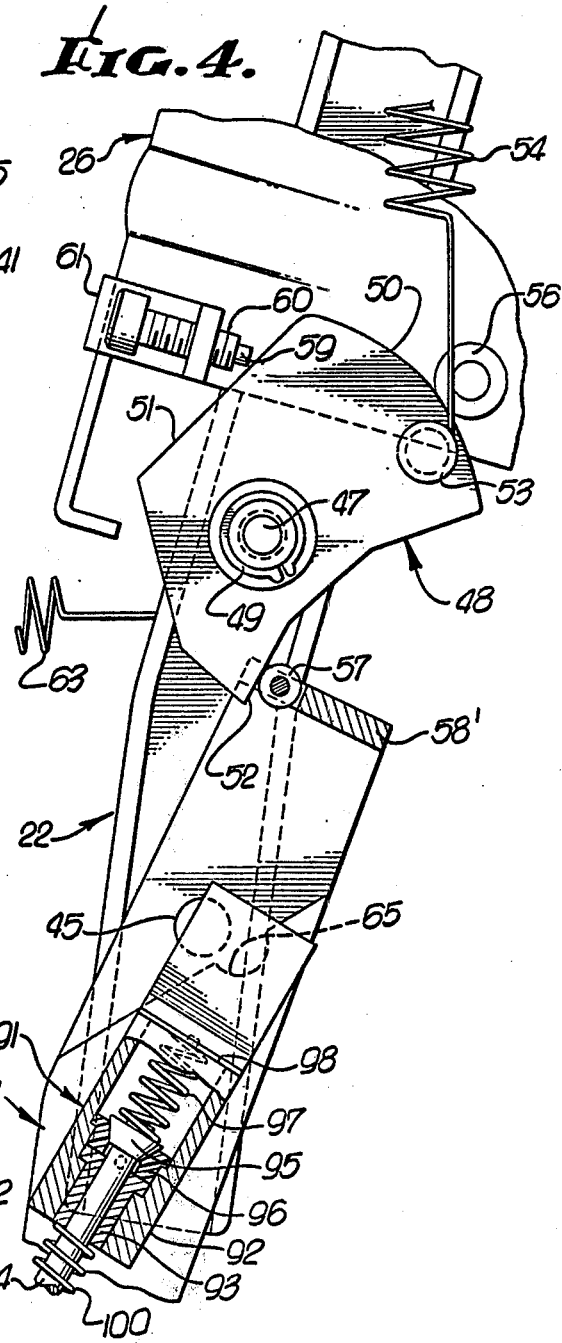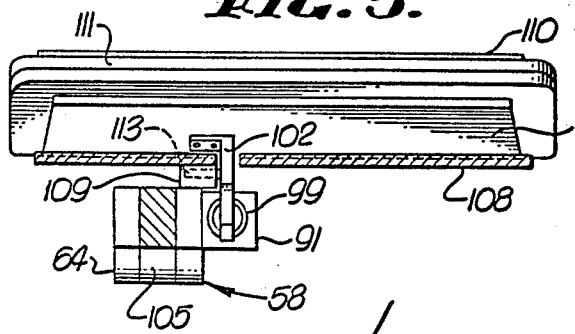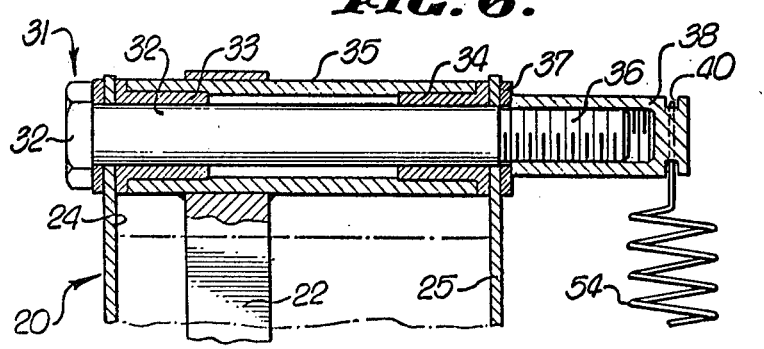

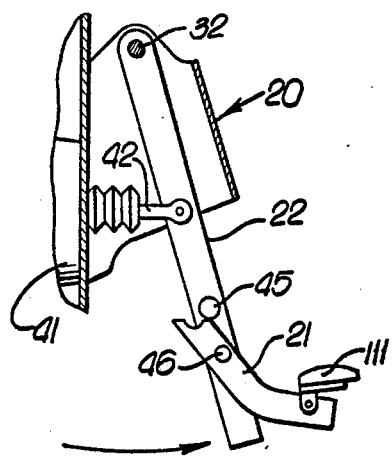
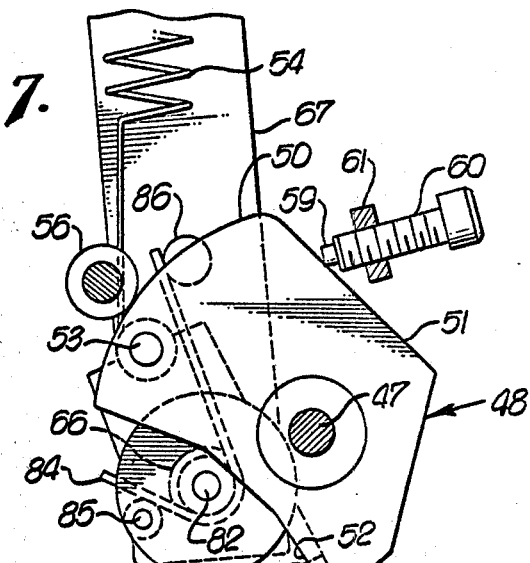
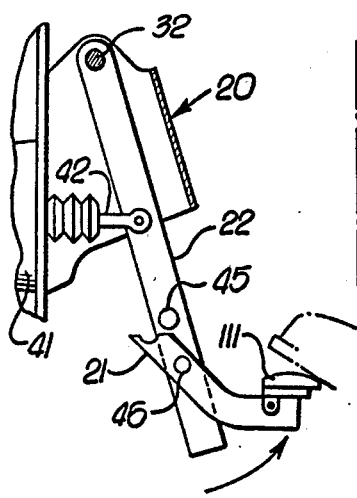
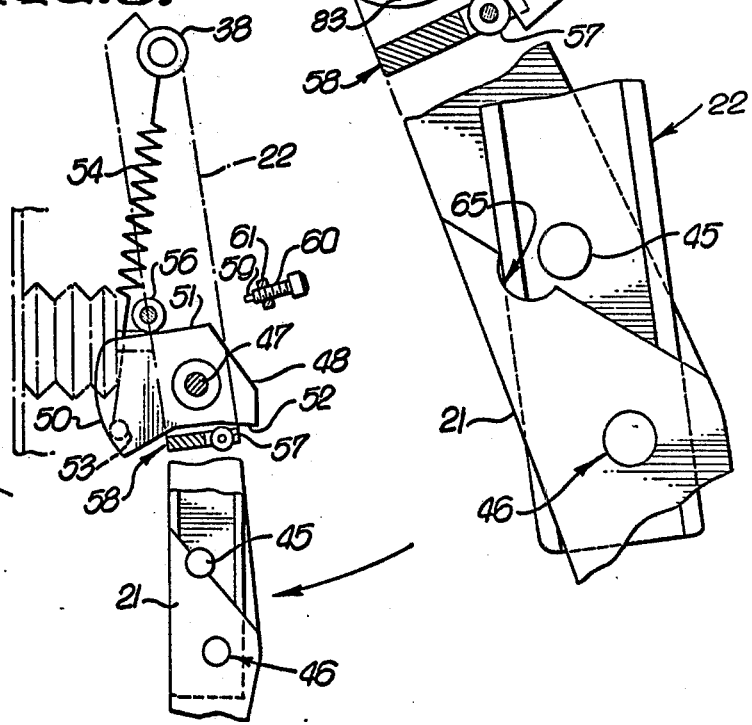
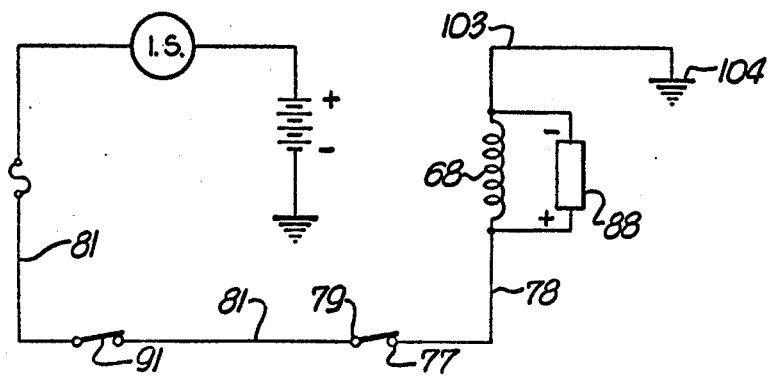

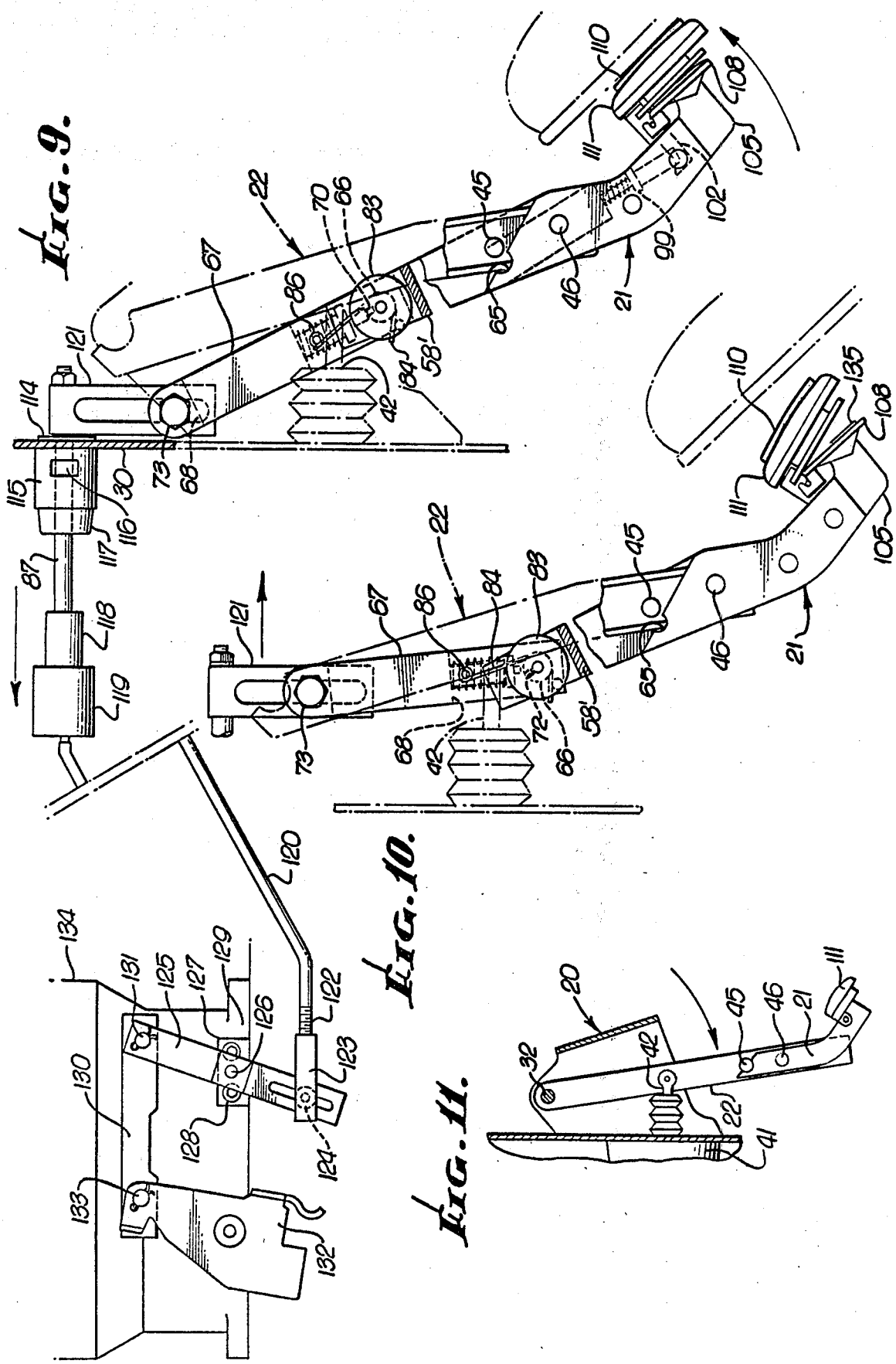

BRAKE AND ACCELERATOR CONTROL FOR OPERATING A MOTOR DRIVEN VEHICLE

This application is a continuation-in-part of my copending application, Ser. No. 303,517, filed Nov. 9, 1972, entitled Improvement on Brake and Accelerator Controls for Operating a Motor Driven Vehicle, now U.S. Pat. No. 3,944,012, granted Mar. 16, 1976, and is a continuation-in-part of my earlier prior application, Ser. No. 826,554, filed on May 21, 1969 abandoned concurrently with the filing of my streamlined continuation application, Ser. No. 148,179, filed on May 28, 1971, and abandoned concurrently with the filing of my aforesaid application, Ser. No. 303,517.

This invention relates generally to foot operated controls employed in moving vehicles, such as an automobile, and more specifically to brake and accelerator controls for controlling the operation of the vehicle internal engine carburetor through operation of an associated accelerator lever and for controlling the operation of the vehicle brake means through an associated brake lever. In a conventional vehicle foot operated controls presently employed in automobiles, and the like, a first pedal is employed for operating the vehicle accelerator lever while a second pedal is provided for operating the vehicle brake lever. In an emergency, the operator of the automobile must remove his foot from the accelerator pedal, transfer it to the brake pedal and then depress the brake pedal until the brakes are applied.

While it is customary for the controlling means of a vehicle to be operated by foot pedals actuated by the driver, some vehicles have said controls operated by hand. The present invention is applicable to both types of operation, and consequently while the invention is described as it is exemplified by a single foot pedal control, it is to be understood as also pertaining to hand control, and the word "manual" is to be understood to include both hand or foot activated control.

It is well known, that in emergencies, an accident may often result because of the reaction time of the driver between awareness of the danger requiring the vehicle to stop and operation by the driver of the vehicle braking means. A portion of this reaction time is directly related to the time in which the driver can remove his foot from one foot control pedal to the other. When a vehicle is traveling at high speed, considerable distance is covered by the vehicle during this reaction time in which the driver is transferring his foot from one pedal to another. Many accidents could be avoided if the reaction time required for the application of the vehicle braking means associated with the vehicle could be reduced. It is therefore the principal object of the present invention to provide a foot operated control for operating accelerator and braking means of a motor driven vehicle through operation of a single manual control so as to reduce the reaction time necessary for the driver to actuate the vehicle deceleration system and bring the vehicle to a stop.

Other objects of the present invention is to provide a manual single control of the above-described type which includes: a single system device activating the accelerator means and braking means of the vehicle without removal of the driver's foot from the pedal; means to prevent concurrent acceleration and braking; means that recalls the carburetor throttle into an idling position when the driver removes his foot from the system or when the system is unattended comprising activating means selectively releasing the accelerator lever from said throttle means irrespective of the positioning of the brake and accelerator levers means.

It is another object of the present invention to provide a single control system of the above-described type located on the center floor space so the driver has the choice to operate the vehicle with his right or left foot when traveling long distances and rest his fatigued leg as well for handicapped drivers.

There is another final object of the present invention to provide a single manual control of the above-described type so as to reduce the reaction time necessary for the driver to actuate the vehicle acceleration system and bring the vehicle engine to a top performance.

Generally stated, the foot operated control for operating accelerator and braking means of a motor driven vehicle through operation of a single pedal, according to the present invention includes a shaft, which is adapted to be mounted to a conventional brake lever mounting bracket presently in use in automobiles, a brake lever associatd with the vehicle braking system and mounted adjacent one end to the shaft and carrying a pivot pin adjacent the other end, the brake lever actuating the vehicle braking system when pivoted in a first direction about the shaft, an accelerator lever associated with the vehicle accelerator means mounted on the brake lever pivot pin adjacent one end of the accelerator lever, such accelerator lever actuating the vehicle accelerator means when pivoted in one direction about the pivot pin, and provision for preventing pivotal movement of the brake lever in the first direction when the accelerator lever has been pivoted in its one operative direction, so that the vehicle accelerator and brake systems can be only mutually exclusively operated, thereby providing a foot operated control in which a single pedal is operated to control both vehicle functions. The invention further contemplates the provision of a pivotally mounted pad assembly or mechanism and associated means for selectively preventing actuation of the accelerator lever irrespective of the position of the brake lever and to prevent actuation of the accelerator lever when the pedal is unattended. There is also provided, a pivotable portion of the accelerator lever that adjacent to one of its ends is mounted and engaged to a secondary shaft of said accelerator lever by a connecting pin, which pin is actuated by a solenoid. When the driver removes his foot, the solenoid is energized by the pad mechanism associated with a normally closed switch actuator. An urging biasing means mounted on said secondary shaft will force backwards said portion of the accelerator lever and recall the throttle linkage, and at the end of such recall stroke, a secondary normally closed switch mounted on said lever portion will open the circuitry to de-energize said solenoid actuator.

Other objects and advantages of this invention will be readily apparent from the following description when considered in connection with the appended drawings.

IN THE DRAWINGS

FIG. 1 is a side elevational view of an exemplary embodiment of a foot operated control apparatus for operating throttle and braking means of a motor driven vehicle in accordance with the present invention showing the brake lever in a brake means unapplied position, the accelerator lever in an idling throttle position and the associated foot pedal in a foot unattended position;

FIG. 2 is a front elevational view of the foot operated control apparatus of FIG. 1;

FIG. 3 is a right side elevational view of the foot operated control of FIG. 2 taken therein along the plane III-III;

FIG. 4 is a detail view, partially in section, of the right hand side of the foot operated control apparatus of FIG. 2 taken therein along the plane IV-IV;

FIG. 5 is a detail view, partially in section, of the lower end of the foot operated control apparatus of FIG. 3 taken therein along the plane V-V;

FIG. 6 is a detail view of the means for mounting the brake lever means showing a main shaft thereof mounted to an otherwise conventional brake lever mounting bracket of a motor vehicle;

FIG. 7 is a detail view of a portion of the apparatus of FIG. 1 particularly the cam member and associated stop pin comprising a portion of the exemplary brake lever stop means of the apparatus of FIG. 1 in a position preventing movement of the associated brake lever means;

FIG. 8 is a detail view of the apparatus of FIG. 7 showing the exemplary cam member pivoted relative to the associated stop pin to allow concurrent movement of the associated brake and accelerator levers in a depressive motion to apply the vehicle associated braking means;

FIG. 9 is a somewhat fragmentary side elevation of the apparatus of FIG. 1 showing foot attended movement of the foot pedal and accelerator lever from an engine idling position in phantom line to a full throttle applied position;

FIG. 10 shows the apparatus of FIG. 9 with the associated throttle lever moved to a motor idling position automatically upon removal of the operator's foot from the pedal of the apparatus;

FIG. 11 is a schematic representation of concurrent depressive movement of the accelerator and brake lever means to apply the vehicle braking means;

FIG. 12 is a schematic representation of the apparatus of FIG. 11 with the brake lever in a brake unapplied position and the accelerator lever in a throttle full open position;

FIG. 13 is a schematic representation of the apparatus of FIG. 12 with the associated pedal in a foot unattended position;

FIG. 14 is an electrical schematic representation of an exemplary electrical circuit means unitilized in the exemplary embodiment of apparatus of FIGS. 1 through 13;

Figure 15:
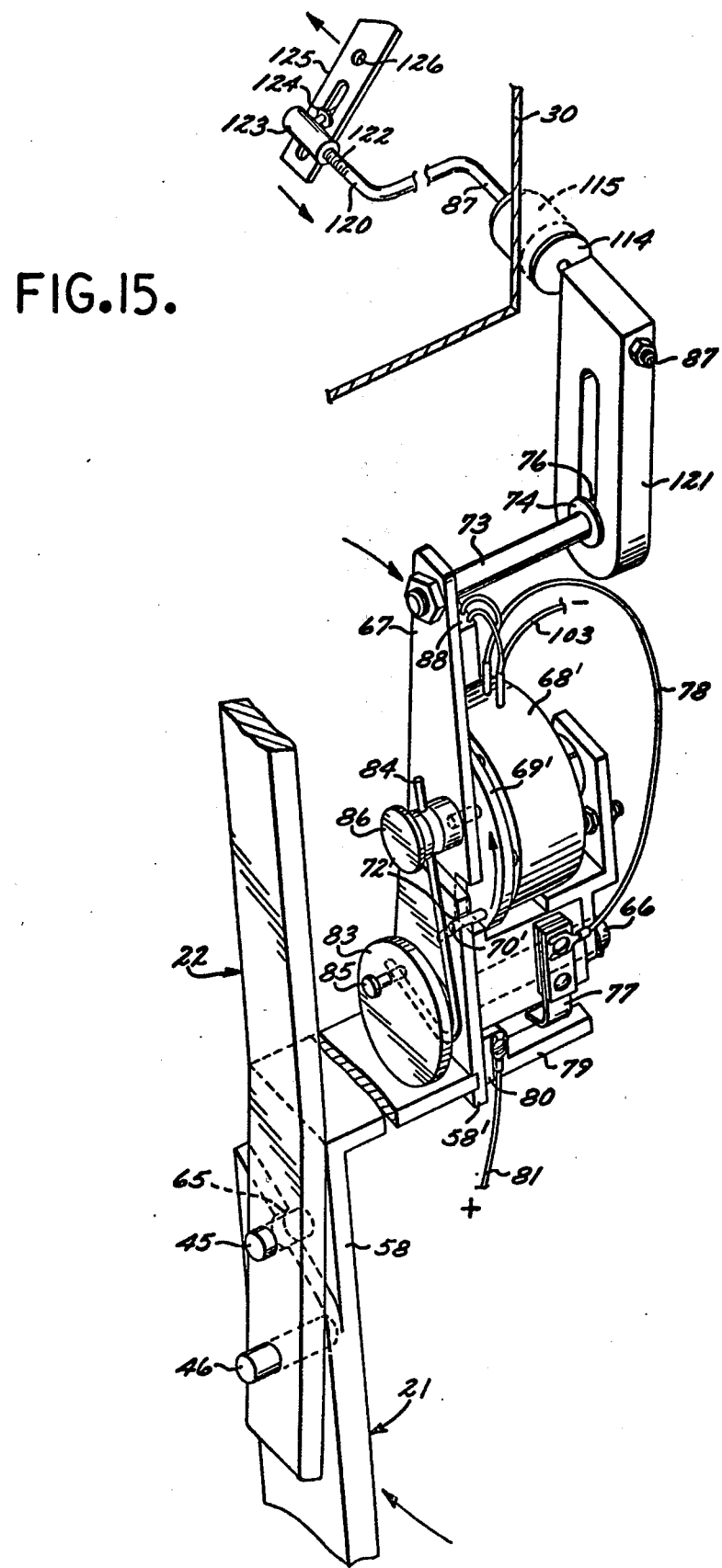
FIG. 15 is a detail view of a portion of the apparatus similar to FIG. 2 representing another electro-mechanical exemplary equivalent of the accelerator lever connecting and deactivating means.

A detailed explanation of a preferred exemplary embodiment of foot operated control apparatus in accordance with the present invention will now be made. However, before getting into the specific details of the exemplary embodiment, a general detailed explanation will be made with regard to the schematic representations of the exemplary apparatus presented in FIGS. 11, 12 and 13.

Referring first to FIG. 11, a brake lever means 22 is pivoted at its upper end on an arbor or main shaft 32 which in turn is secured to a mounting bracket indicated generally at 20. Brake lever means 22 controlling braking means is associated by rod 42 with a conventional power cylinder 41 of a vehicle braking system. Movement of brake lever 22 about its pivot at 32 in a clockwise direction, as indicated by the arrow in FIG. 11, a depressive movement applied the vehicle braking means in a conventional manner.

An accelerator lever means 21 controlling the throttle power supply means is pivoted by pivot pin 46 on the brake lever for a limited pivotal movement thereon, such pivotal movement being limited by the stop pin 45 also provided on the brake lever. A foot pedal 111 is mounted at the lower end of the accelerator lever 21 located adjacent and selectively operable with said brake lever. It can be seen, therefore, that depressive movement of pedal 111 will be transmitted through accelerator lever 21, stop pin 45 and brake lever 22 to the brake means applying rod 42.

In accordance with the present invention, and as illustrated in FIG. 12, an upward or counterclockwise pivotal movement of accelerator 21 relative to the brake lever 22 causes acceleration of the vehicle. As will be described in greater detail hereinafter, accelerator lever 21 is associated with the carburetor of the motor of the vehicle to move the throttle to a full open position when the accelerator lever 21 is allowed to pivot upwardly relative to brake lever 22 into the position of FIG. 12. However, as a safety feature, should the operator inadvertently remove his foot from the accelerator lever pedal, the pedal 111 is biased and urged to pivot away from the lever 21 as seen in FIG. 13, and actuate associated means for causing the motor throttle to be returned to an engine idling position.

In the general operation of the control apparatus of the present invention, therefore, a depressive concurrent movement of accelerator lever means 21 and brake lever means 22 causes application of the vehicle braking means while a pivotal movement of accelerator lever means 21 relative to brake lever means 22 causes acceleration of deceleration of the vehicle motor means. With the foregoing general description of the relative functioning of the combined accelerator and braking functions in the single foot operated control apparatus of the present invention, a detailed explanation of the preferred exemplary embodiment thereof will now be made.

Referring now to FIGS. 1, 2 and 3, the preferred exemplary embodiment of foot operated control apparatus in accordance with the present invention comprises a housing indicated generally at 20, which may be provided by the conventional brake lever mounting bracket in present day automobiles, an accelerator lever means indicated generally at 21, a brake lever means indicated generally at 22 and a foot pedal means and associated mounting assembly indicated generally at 23.

The housing or mounting bracket 20 includes a pair of sidewalls 24 and 25 integrally formed with the front or top wall 26. Mounting flanges 27 and 28 provided on the sidewalls 24 and 25, respectively, are shown mounted by bolts 29 to the vertical forward firewall 30 of a conventional motor driven vehicle. It will of course be understood that the housing or mounting bracket may be otherwise constructed or located in the vehicle depending upon the type of motor vehicle in which the present apparatus is utilized. It is contemplated that the control apparatus of the present invention will be preferably located with respect to the interior floorboard of the vehicle so that the vehicle operator can conveniently rest the heel of his foot at a convenient and relaxing angle while allowing him to actuate the foot operated control through the arcuate movement thereof as more fully described hereinafter.

Means are provided for mounting the brake lever means indicated generally at 22 in the vehicle in association with the vehicle braking means to operate the braking means in response to pivotal movement of the brake lever means. As seen in FIGS. 1, 2 and 3, such brake lever mounting means include the provision of an arbor or main shaft assembly, illustrated generally at 31 in FIGS. 1 and 2 and shown in detail in FIG. 6, supported by the housing or mounting bracket 20. As best seen in FIG. 6, bolt 32 is inserted through suitable openings in the bracket sidewalls 24 and 25 with bushings 33 and 34 rotatably mounting a hollow shaft 35 about bolt 32 and between bracket sidewalls 24 and 25. The upper end of brake lever 22 is fixedly secured to this pivotally mounted hollow shaft 35 for pivotal movement about the axis of bolt 32.

Bolt 32 is provided with a threaded end 36, protruding outwardly of bracket sidewall 25, to receive a locking nut 38 thereon. A spacing washer 37 may be provided between nut 38 and sidewall 25. As seen in FIG. 2, a flat surface 39 may be provided on this elongated hollow nut 38 to facilitate attachment of a wrench for turning the nut onto bolt 32.

Brake lever means 22 is thus mounted relative to the housing or bracket means indicated generally at 20 for pivotal movement about its upper end relative to the vertical firewall or forward floorboards 30 of a conventional motor vehicle. The control apparatus of the present invention is intended for use on vehicles which include conventional braking means which may include hydraulic braking or power brake systems including a vacuum power cylinder 41 as illustrated in FIG. 1. Power cylinder is provided with an operating rod 42 extending through the floorboard or vertical firewall 30. This operating rod is pivotally connected to the brake lever means 22 by mounting a swivel head portion 43 of rod 42 on a pivot pin 44 provided on brake lever 22 at a location spaced from the pivotal axis of the brake lever provided by the axis of bolt 32. Depression of brake lever 22, as seen in FIG. 1, causes an inward movement of operating rod 42 into the hydraulic pump or master cylinder, or vacuum power cylinder 41 illustrated, so as to actuate the associated vehicle braking means.

In the exemplary embodiment, the brake lever means 22 also mounts an accelerator stop pin 45, an accelerator lever mounting pivot pin 46 and an arbor 47 as best seen in FIG. 2. Each of these pins and arbor may be fixedly mounted to lever 22, as by a press fit therein. The function of each of these pins and arbor will be explained hereinafter.

As particularly contemplated within the present invention, accelerator lever means, indicated generally at 21, are pivotally mounted on the brake lever means indicated generally at 22. In the exemplary embodiment, the accelerator lever means 21 are pivotally mounted by pivot pin 46 on a lower end of the brake lever 22, and is associated with the vehicle accelerator means. The term "vehicle accelerator means" is used herein to refer and include the carburetor of an internal combustion engine or any accelerator and throttle power supply means of a vehicle, as seen in FIG. 9, for example, of the vehicle and the associated mechanisms for actuating the carburetor so as to control the power output of the internal combustion engine in the conventional manner. As best seen in FIG. 2, accelerator lever means 21 includes a yoke having a first arm 64, on the left side of brake lever 22, and a second arm 58 disposed on the opposite, right, side of brake lever 22. As seen in FIG. 2, arm 58 has an upper extension 58' which is operably associated with a control rod 87 connected to the engine carburetor throttle in a manner hereinafter explained.

Accelerator stop means are provided on the brake lever means for limiting the pivotal movement of the accelerator lever means relative to the brake lever means so that concurrent depressive movement of the accelerator lever and brake lever means can be effected through depression of the foot pedal 111 mounted on the accelerator means. In the exemplary embodiment, such accelerator stop means includes the stop pin 45 provided on brake lever 22 as seen in FIGS. 1 and 2. Associated stop surfaces with concave portions 65 are provided at the upper end portions of each of yoke arms 64 and 58 as seen in FIGS. 1 and 2. Clockwise rotation of lever 21 about its pivot pin 46 is limited by contact of the stop surface 65 with pin 45. Such engagement is illustrated in the schematical representation of FIG. 11 wherein depression of pedal 111 causes concurrent movement of levers 21 and 22 to allow application of the vehicle braking means.

The accelerator lever means, indicated generally at 21, is associated with the vehicle throttle means for operating the vehicle engine in response to the aforedescribed pivotal movement relative to the brake lever means 22. As seen in FIG. 2, arm 58 is provided in the exemplary embodiment with a prolonged, crank arm, portion 58' on the right hand side of brake lever 22. A shaft 66 is mounted on the upper end of crank arm 58'. The portion of the accelerator lever including portions 58 and 58' may be considered lower portions of the accelerator lever. A separately movable upper lever portion 67 is provided in the exemplary embodiment, pivotally mounted on the aforementioned shaft 66. As described more fully hereinafter, lever 67 is normally connected to the lower lever portions 58 and 58' for concurrent pivotal movement therewith about pin 46. Connecting means are provided for connecting the upper lever portion 67 with the lower lever portion 58' of the accelerator lever means for common pivotal movement thereof in response to movement of the foot pedal 111. In the exemplary embodiment, such connecting means include the provision of a solenoid 68 mounted on the upper portion or actuating lever portion 67 of the accelerator lever means. Solenoid 68 or 68' includes a movable member 69 or 69', as best seen in FIGS. 2, 3 and 15, having connecting pin means 70 or 70' at the lower end or radially disposed thereof to engage in a pin keeper means or slot 72 or 72'. Spring 71 not shown on FIG. 15, but incorporated into solenoid 68' therein, loads connecting pin means 70 or 70' so that when upper lever portion 67 is in a straight, aligned position with regard to crank arm 58', the connecting pin means 70 or 70' will locate in the slot or pin keeper 72 or 72'. The upper and lower ends of the accelerator lever means are thereby normally connected together for concurrent rotation about pin 46.

Figure 16:
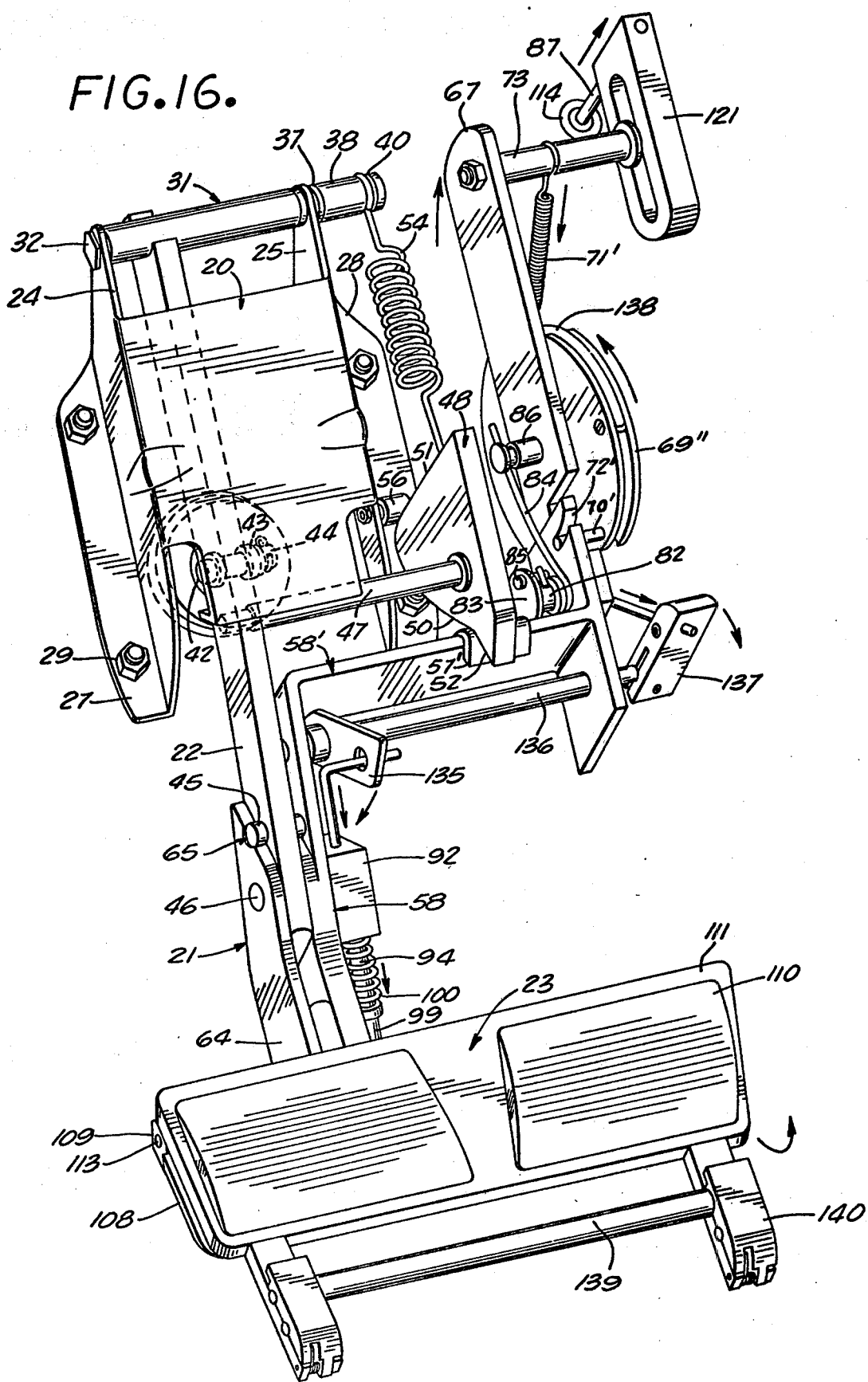
FIG. 16 is a detail prospective view of a mechanical exemplary equivalent, particularly of the accelerator lever connecting and deactivating means similar to FIGS. 1, 2 and 15.

The upper end of the lever 67 is provided with a shaft or horizontally extending bar 73 which carries a driving roller 76 between end washers 74 and 75 on an outer end thereof. As best seen in FIGS. 9, 15 and 16, pivotal movement of the accelerator lever means about pin 46 causes an arcuate movement of the upper end of upper lever portion 67. This arcuate movement of the upper end of lever 67 is translated into horizontal movement of control rod 87 through the provision of driving roller 76 within a vertical slot in depending slotted link 121. Roller 76 rides up and down within the slot in link 121 translating the arcuate movement of the upper end of lever 67 into horizontal translational movement of rod 87, as can be seen from a comparison of FIGS. 9, 10, 15 and 16.

Referring to FIGS. 1, 9 and 15, control rod 87 is associated with the throttle means of the vehicle carburetor in the exemplary embodiment. Slotted link 121 in mounted to control rod 87 by a conventional nut as illustrated. Control rod 87 is mounted for horizontal movement through bushing 114 secured by locking nut 115 to the vehicle floorboard or firewall 30. A flat 116 is illustrated for facilitating fitting a wrench to nut 115. A resilient shock absorber element 117 is preferably provided on nut 115, as seen in FIGS. 1 and 9. The throttle rod 120 is connected by a ball joint 119 and coupling assembly 118 to control rod 87, the coupling assembly 118 abutting shock absorber 117 when the accelerator lever is moved to an engine idling position.

The exemplary vehicle carburetor means, as seen in FIG. 9, and partially in FIG. 15, includes a throttle rod 120 having a threaded end 122 connected to a tapped link 123. Adjustable connecting link 123 has a side swivel 124 with a bolt and nut connected to the slotted end of the associated throttle lever 125. Throttle lever 125 is pivotally mounted on shaft 126. Shaft 126 is attached to bracket 127 which is mounted by screws 128 to the carburetor flange or boss 129. The upper opposite end of throttle lever 125 is connected to the equalizer link 130 through a swivel pin 131 and the use of conventional washers and cotter pin. Equalizer link 130 is in turn connected to the carburetor throttle lever 132 by swivel pin 133 and associated conventional washers and a cotter pin. The carburetor body is indicated at 134.

From the foregoing, it can be seen that an upward movement of pedal 111 in a counterclockwise direction about pivot pin 46, as viewed in FIG. 9, causes an opening of the throttle power supply means of the carburetor to accelerate the vehicle engine in response to the driver's selective operating movement. Initial depression of pedal 111 from the position of FIG. 9, into the position of accelerator lever means 21 of FIG. 11 causes deceleration of the vehicle motor. Thereafter, concurrent depression of accelerator lever 21 and brake lever 22 causes application of the vehicle braking means.

Means sequentially limiting the structural functional operations are provided for preventing the concurrent actuation of the vehicle braking means when the accelerator lever is being depressed from a motor accelerated position. As further particularly contemplated within the present invention, means are provided for preventing operation of the vehicle braking means to apply the vehicle braking means until the accelerator lever means has been pivoted relative to the brake lever means into a throttle closed or engine idling position. Referring to FIG. 9, the accelerator lever means 21 is shown pivoted in a counterclockwise direction relative to the brake lever means 22, stop surface 65 being illustrated out of engagement with stop pin 45. In this position of the accelerator lever 21 relative to brake lever 22, the engine throttle is fully open so that the vehicle is being operated at maximum engine speed. In order to decelerate or stop the vehicle, the operator depresses the pedal 111, in order to decelerate the engine and apply the braking means. However, in order to prevent the premature application of the vehicle braking means before the engine has been decelerated, brake lever stop means are provided in association with the brake lever means and accelerator means for preventing movement of the brake lever means to apply the brake means until the accelerator means has been moved to its engine idling position, i.e., when lever 21 is pivoted relative to lever 22 to bring surface 65 into contact with pin 45.

In the exemplary embodiment, the aforementioned brake lever stop means are provided by pivotally mounting a cam member, indicated generally at 48, on an arbor 47 carried by the brake lever 22. Cam 48 may be mounted to arbor 47 by snap ring 49, as best seen in FIG. 4. A follower 56 is rotatably mounted by an arbor and a conventional lock washer and nut to the sidewall 25 of the mounting bracket as seen in FIGS. 2 and 4. With the cam member 48 in the position illustrated in FIGS. 2 and 4, its forward arcuate surface 50 abuts cam follower 56 preventing pivotal movement of brake lever 22 about its upper pivotal end, counterclockwise in FIG. 4. Cam member 48 is biased by urging means 54 into this brake lever locking position of FIGS. 2 and 4. As best seen in FIG. 4, a pin 53 is mounted on the side of the cam member and receives the lower end of urging means 54. The upper end of urging means 54, as seen in FIG. 2, is mounted on the slotted end 40 of nut 38 previously described in association with the main shaft or arbor assembly indicated generally at 31. The bias thus provided on member 48 tends to rotate it counterclockwise about its axis of rotation provided by the axis of arbor 47. An adjustable stop pin 59, including a fitted body portion 60, is mounted on a flange 61 on bracket sidewall 25 to limit such counterclockwise rotation of cam member 48.

The aforementioned cam member 48 is also associated with the previously described accelerator lever means so that movement of the accelerator lever means into its aligned engagement with the brake lever means not only places the engine in an idling condition but also pivots the cam member 48 into position allowing movement of the brake lever 22 in a direction to apply the vehicle braking means, as best seen in FIG. 16. As seen in FIG. 4, a cam roller 57, or a round surface element as shown in FIG. 16, is mounted on a horizontal portion of crank arm 58' of the accelerator lever means to underlie cam surface 52. The cam member and associated brake lever and accelerator lever means are illustrated in FIG. 7 when viewed from the opposite direction as that in FIG. 4. On pivotal movement of the accelerator lever 21 relative to the brake lever 22 into the aligned position shown in FIGS. 8 and 16, follower 57 or rounded seat member 57' rotates cam member 48 about its arbor 47 until the stationary cam follower 56 rolls over surface 50 onto surface 51. Concurrent depressive movement of levers 21 and 22, as illustrated in FIGS. 8 and 16, is thereafter allowed with the cam member riding under cam follower 56. Such depression of the levers 21 and 22 is accomplished by the operator pressing on the foot pedal 111 against the outward spring bias provided to the actuating rod 42.

Brake lever 22 in the exemplary embodiment is also provided with a pin 62 mounted adjacent arbor 47. A spring 63, as best seen in FIG. 1, is hooked at one end onto pin 62 and at the other end to an adjustable screw, not illustrated, preferably located on the vehicle dash panel. Spring 63 functions to absorb the brake lever end play and is suggested only for vehicles equipped with power brakes.

The spring bias for the brake lever to move it counterclockwise in FIG. 1 is provided by the conventional biasing means associated with control rod 42 in the conventional vehicle. Such upward movement of the foot pedal 111 and associated brake lever causes a return of the cam member 48 under the urging of its associated urging means 54 to the active position illustrated on FIGS. 1 through 4.

As further particularly contemplated within the present invention, means releasably connecting the accelerator lever with the throttle power supply means are provided; the foot pedal assembly is associated with the accelerator deactivating means so that the engine or motor of the vehicle is automatically decelerated to an engine idling position in the event that the operator purposely or inadvertently removes his foot from the foot operated control apparatus of the present invention. In the preferred exemplary embodiment, such is accomplished through the provision of activating means selectively releasing the accelerator lever from said throttle means irrespective of the positioning of the brake and or accelerator levers, including: a pedal mounting assembly for pivotally mounting the pedal on the lower end of the accelerator lever and associated mechanical means or electrical circuitry means connected to the aforementioned solenoid means for automatically disconnecting the upper and lower portions of the accelerator lever on release of the foot pedal and to the provision of urging biasing means 84, as shown in FIGS. 15 and 16 for biasing the upper portion of the accelerator lever to move the throttle to an engine idling position.

Referring to FIGS. 1, 2, 3, and 5, the exemplary foot pedal assembly 23 includes a mounting arm 105 of generally L-shape with the upper leg of the L secured between the lower ends of accelerator lever arms 64 and 58 by means of riveting, as at 106 and 107. The lower leg of L-shaped member 105 mounts a fixed plate 108 which has a depending, somewhat U-shaped portion 109 at the upper end thereof when viewed in FIG. 1. A connecting shaft 113 is pivotally mounted in the U of member 109, such connecting shaft being secured in arm 102 upon which foot pedal 111 is mounted. Foot pedal 111 therefore pivots on connecting shaft 113 relative to the stationary plate 108. The upper surface of pedal 111 is provided with a rubber layer 110 to provide an anti-slip contact surface for the operator foot. The underside of pedal 111 is provided with a plate 112 which engages fixed plate 108 when the pedal is depressed thereon. A layer of resilient material 135 may be provided on the upper surface of plate 108 to cause a more silent operation of the assembly when plate 112 is pivoted down upon the support or fixed plate 108.

The lower end of arm 102, as seen in FIG. 3, is associated with a normally closed electrical switch 91 which in turn is associated with the solenoid means 68 which normally holds the upper and lower lever portions 67 and 58' of the accelerator lever means in connected relation. As seen in FIG. 3, normally closed electrical switch 91 is mounted to accelerator lever lower portion 58. This normally closed switch 91 is illustrated schematically in the electrical diagram of FIG. 14. In FIGS. 2 and 14, positive lead wire 81 is shown connected into switch 91. As best seen in FIG. 4, switch 91 includes an insulated housing 92 with an insulated bushing 93 mounting an actuator shaft 94. Shaft 94 carries a terminal contact taper 95 which can seat on contact into taper bushing 96 and is normally in contact with terminal contact taper 95 due to the biasing means 100. Shaft 94 is located within the housing 92, and biasing means 100. Spring 97 seats against insulted cover housing 98. Actuator shaft 94 has a prolongation 99, as best seen in FIG. 3, such prolongation being constructed of an insulated and self-lubricating material preferably. Prolongation 99 is adjustably mounted by a threaded connection on the lower end of shaft 94 so that the biasing means 100, which is located between housing 92 and a flange of prolongation 99 can be adjusted as required. The prolongation 99 is provided at its end with a clevis-groove 101 with a 180° radius on the groove bottom to be operably actuable by the tongue of pivot arm 102, such tongue locating in the clevis-groove.

From the foregoing, it can be seen that the foot pedal 111 is biased into a raised position under the urging of biasing means 100 interposed between the housing 92 and prolongation 99 engaging pedal arm 102. Depression of pedal 111 against fixed plate 108 causes shaft 94 and taper contact 95 to break away from taper bushing contact 96, in FIG. 4, breaking the contacts off in the electrical switch 91 in FIG. 14. Therefore, when the operator purposely or inadvertently lifts his foot off the pedal 111, as explained more fully hereinafter, the electrical circuit of FIG. 14 is closed by a closing of switch 91 which operates the solenoid 68 to cause deceleration of the engine vehicle to an idling position adjustment.

As discussed previously, solenoid connecting pin means 70 is normally engaged in the pin keeper or slot 72 to maintain the upper lever portion 67 and lower lever portion 58, 58' of the accelerator means in connected relation. This "connected" relation is seen in FIGS. 9 and 15. Referring particularly to FIGS. 2 and 15, urging biasing means 84 is operably associated with the upper and lower lever portions of the accelerator lever means to cause pivotal movement of the upper lever 67 about shaft 66 relative to lower lever portion 58' upon removal of connecting pin means 70 or 70' from pin keeper or slot 72 or 72'. The upper end of urging biasing means 84, as seen in FIGS. 2, 7, and 15, is engaged upon a pin 86 secured to upper lever 67. A central body portion of urging biasing means 84 is wrapped about and mounted on a left hand prolongation 82 of shaft 66, and end flange 83 being mounted on shaft prolongation 82. The lower end of urging biasing means 84, as best seen in FIG. 7, engages against stationary pin 85 mounted on flange 83. Urging biasing means 84 therefore biases the upper lever portion 67 to pivot on shaft 66 from the position of FIG. 9 into the positions of FIGS. 3, 7 or 10 when the connecting means provided by solenoid pin means 70 and pin keeper 72 are disengaged. Therefore, when solenoid 68 is energized, as by closing of switch 91 on removal of the operator's foot from the pedal 111, connecting pin means 70 is recalled, unlocking actuator lever 67 from the lower lever portion. Actuating lever 67 then is rotated clockwise about shaft 66, in FIG. 7, to move the associated throttle actuating rod 87 outwardly of the firewall into an engine idling position, as seen best in FIG. 10.

Upon the aforedescribed pivotal movement of upper lever 67 about shaft 66, another electrical contact provided is broken causing de-energization of the solenoid and the return of its connecting pin means 70 to an extended position under the associated spring bias 71. On subsequent depression of the foot pedal to bring the lower accelerator lever portion into alignment with the upper lever portion, the de-activated solenoid pin means 70 will snap into the pin keeper or slot 72 again connecting the upper and lower lever portions for concurrent movement. In the exemplary embodiment, such additional contact means is provided by a flexible leaf switch, arm or contact 77 mounted by insulating material to the lower end of upper lever portion 67 as seen in FIGS. 2, 3 and 15. Flexible leaf 77 normally rests in closed position over contact plate 79 which is mounted by insulation material 80 to the side of the upper end of crank arm portion 58', also as seen in FIG. 2 and 15. As seen in FIGS. 2 and 14, the positive lead wire 81 is run from the switch 91 to contact plate 79. Leaf arm 77 is connected by lead line 78 to the positive side of solenoid 68. The negative side of solenoid 68 is connected by lead line 103 to ground, as to the firewall bolt 104. In addition, as illustrated in FIG. 14, solenoid 68 is preferably provided with an arc suppressor diode capacitor 88 of the Zener diode design in the preferred exemplary embodiment.

Referring to FIG. 14, the preferred exemplary electrical circuitry for the foot operated control apparatus of the present invention includes a positive lead line run from the conventional 12 volt D. C. battery power source provided in conventional automobiles. The positive lead line is extended to the ignition switch of the vehicle and through the fuse panel. Positive line 81 is then connected from the fuse to the normally closed foot operated pedal switch 91, which is actually held open by the presence of the operator's foot. Line 81 is then continued to the second normally closed switch 77, 79 associated between the upper and lower portions of the accelerator lever adjacent the solenoid 68. Line 78 from contact 77 runs to the solenoid and from there by line 103 to ground bolt 104. It has been found desirable to use an arc suppressor 88 to eliminate arcing that can be caused by reverse voltage spikes produced when the circuit to the solenoid is discontinued.

From the foregoing, it can be seen that when the foot operated control is unattended or the driver's foot is accidentally removed from the pedal, switch 91 is allowed to move to its normally closed position actuating solenoid 68 to recall connecting pin means 70 from slot 72 as previously described. Urging biasing means 84 then biases actuator lever 67 to withdraw the throttle actuator lever 87 to an engine idling position independently of the position of the lower portions of the accelerator lever 58 and the associated foot operated pedal. Upon such relative movement of the upper and lower lever portions 67 and 58' respectively, the normally closed switch 77, 79 opens de-energizing the solenoid and allowing return of the connecting pin means to its normally projected position. Should the driver then depress the foot pedal to bring the lower and upper accelerator lever portions into alignment, pin means 70 will snap into slot 72 and the upper and lower portions will be again locked in aligned connected relation for selective operation of the throttle of the carburetor through movement of the control apparatus pedal 111.

The operation of the aforedescribed exemplary embodiment of the foot control apparatus during normal driving conditions will now be explained. With the apparatus in the position of FIG. 1, as noted previously, the accelerator lever is in a position where the throttle is partially open. This allows for the supply of gas normally provided to the carburetor on starting the engine. Starting from the position of FIG. 1, the operator first place his foot on pedal 111 pivoting it down upon the fixed plate 108. The accelerator lever pivots relative to brake lever 22, pivoting cam member 48 as aforedescribed to allow further depression of both accelerator lever and brake lever to apply the brakes. Of course it is not necessary to apply the brakes at the time of starting the car, so the operator may merely wish to pump the pedal assembly and associated accelerator lever 21 relative to stationary brake lever 22 at the time he turns on the ignition. It should be noted that in the event the operator turns the ignition to "ON" without placing his foot on the pedal, the solenoid 68 will be instantaneously energized to place the throttle in an idling speed as opposed to a somewhat higher engine operating speed for the throttle illustrated in FIG. 1.

After starting the vehicle, and placing the transmission selector lever in the desired location, the vehicle engine may be accelerated by allowing a gradual raising of the pedal and associated accelerator lever 21 under the control of the operator's foot under urging of an associated urging means on the accelerator lever. At any time when it becomes necessary or desirable to decelerate and/or stop the vehicle, a downward depression of the single pedal will initially cause deceleration of the engine and thereafter application of the vehicle braking means. Simultaneous application of the vehicle braking means and acceleration of the vehicle motor are prevented through the aforedescribed brake lever stop means, including cam member 48, associated with the brake lever and accelerator lever means. Having stopped the vehicle, or starting from a stopped position, a gradual or more rapid releasing of the foot pedal, at the operator's discretion, will first release the brake means associated with the vehicle and thereafter cause acceleration of the engine of the vehicle.

Referring to FIG. 15, shows a detail view of a portion of the apparatus similar to FIG. 2, representing another electro-mechanical exemplary equivalent embodiment of the accelerator lever connecting and deactivating means, particularly, an interlocking mechanism actuated by rotary solenoid means 68 mounted at one end of the accelerator lever, the other end of said accelerator lever associated with the foot pedal as previously described. The rotary solenoid, including a return coil spring, said rotary solenoid mounted on said pivotable lever portion and carrying a movable member 69', a connecting pin 70' radially mounted on said movable member, said connecting pin normally located on a radial slot located at the lower end portion 58' of said accelerator lever, said slot 72' radially aligned with said connecting pin 70' relative to the center axis of said rotary solenoid mounted on said upper portion 67 of the accelerator lever which biases upon urging biasing means 84 when said rotary solenoid is energized.

Referring now to FIG. 16, is a detail propsective view of another mechanical exemplary equivalent embodiment, particularly of a modified feature of the single apparatus control similar to the above described type of FIGS. 1 and 2, having a mechanical interlocking mechanism for connecting and deactivating the accelerator lever associated with the throttle means of the vehicle. The throttle means, with this arrangement, will return to idling position when spring 100, upon removal of the foot from pedal 111, overcomes spring 71' through the modified mechanical connection of shaft 94 which in this case is guided into housing 92 to meet bracket 135 of rod 136 rotatably mounted on the accelerator lower lever portion 58' and having at one end a clamping wire 137. Wire 138 is mounted around movable member 69" which has a radial pin 70' normally located into radial slot 72' as above described and illustrated in FIG. 15. Similar as described and illustrated in FIG. 15, movable member 69" operates and is mounted on the accelerator upper lever portion 67 responsive to urging biasing means 84 when said foot pedal 111 is unattended. In addition the lower end of the foot pedal 111 is provided with an optional adjustable crossbar 139 snap fastened to sides locks 140. Crossbar 139 may be located in a lower position for major comfort and driver's convenience.

It can be seen from the foregoing detailed explanation of the foot operated control apparatus its preferred and alternative exemplary embodiment of the present invention that the objects recited initially herein have been attained. The foot operated control of the present invention may be operated to brake or decelerate or accelerate the vehicle at a maximum rate with a minimum reaction time requirement on the part of the operator. The operator is allowed to use either his left or right foot on a single foot pedal to immediately cause engine acceleration deceleration and braking without the need for moving his foot from a separate accelerator pedal to a brake pedal and viceversa. Moreover, it is believed to be a natural human reaction to depress a foot pedal to cause engine deceleration and braking and to cause acceleration to a foot pedal releasing or raising movement.

Having thus described the preferred and alternative exemplary embodiment of the foot operated control apparatus in accordance with the present invention, it should be noted by those skilled in the art that other modifications and variations of the present invention may be made in light of the within teachings and disclosure. It is therefore to be understood that the scope of the present invention is limited only and defined by the appended claims.

I claim:

1. In brake and accelerator controls for operating a motor driven vehicle, said controls comprising:
   a brake lever operably connected to the braking control means of said vehicle,
   an accelerator control lever means pivotally mounted on said brake lever and selectively operable concurrently with said braking control means,
   an interlocking mechanism mounted on said accelerator control lever means comprising:
      connecting means releasably connecting a first end of said accelerator control lever means to the vehicle throttle means, and a movable member capable of causing said connecting means to release,
   a foot pedal assembly mounted on a second end of said accelerator control lever means, comprising:
      a bottom portion attached to said second end of said accelerator control lever means, a pedal portion pivotally connected to said bottom portion,
      urging means causing said pedal portion to pivot away from said bottom portion, and a surface of said pedal portion upon which an operator may place a foot to overcome said urging means causing said pedal portion to pivot against said bottom portion.
   a mechanical linkage between said pedal portion and said interlocking mechanism movable member such that said interlocking mechanism connecting means is caused to release only when said pedal portion is pivoted away from said bottom portion.

2. In brake and accelerator controls for operating a motor driven vehicle of claim 1, wherein said foot pedal assembly includes.
   adjustable means for positioning a portion of said foot pedal assembly at selected distances from said pedal portion.

* * * * *